Nov. 24, 1959   A. L. McLAIN   2,913,846
APPARATUS FOR CONTROLLING THE UPSTREAM MOVEMENT OF FISH
Filed March 24, 1958   2 Sheets-Sheet 2

INVENTOR.
Alberton L. McLain
BY
ATTORNEY

2,913,846
APPARATUS FOR CONTROLLING THE
UPSTREAM MOVEMENT OF FISH

Alberton L. McLain, Marquette, Mich., assignor to the United States of America as represented by the Secretary of the Interior Application March 24, 1958, Serial No. 723,612

12 Claims. (Cl. 43—17.1)

(Granted under Title 35, U.S. Code (1952), sec. 266)

The invention herein described and claimed may be manufactured and used by or for the Government of the United States of America for governmental purposes without the payment of royalties thereon or therefor.

The invention relates to an improved apparatus for controlling the movements of various aquatic animals in bodies of water.

In Patent 2,778,140, to Applegate et al., there is described an apparatus for establishing a stepwise A.C. field across a stream in the path of upstream fish migrations. The field strengths are so selected that desirable food and game fish for example, moving up the stream, will be repelled. Sea lampreys, because of their more primative nervous system will not be affected by the lower or A.C. voltage gradient field and will swim through it to be killed by the adjacent higher voltage gradient A.C. field.

Associated with this A.C. field apparatus is a D.C. field, spaced so as to attract the desirable fish to an electrically shielded trap located at one bank adjacent the upstream end of the obliquely disposed A.C. electrodes creating the A.C. field.

For further information and a full discussion of the nature of the sea lamprey problem, with which this invention is specifically concerned, recourse may be had to the aforesaid patent, and to Patent 2,821,499 to Applegate et al.

It is an object of this invention to provide an improved D.C. guiding field for aquatic animals.

It is another object of this invention to provide a means for extending a D.C. field in the water to a greater effective distance from the negative electrode.

It is another object of the invention to greatly reduce the electrical field near the bank.

It is a further object of the invention to diminish or greatly reduce the electrical field near the trap employed to ensnare the affected animals, which is located at the bank near the end of the electrodes producing the D.C. field.

It is a further object to employ an improved apparatus for controlling the movement of aquatic animals which may readily be adjusted for varying conditions.

It is a further object of the invention to provide an improved apparatus for controlling certain aquatic animals, which is relatively nonhazardous as regards higher animal life.

It is a further object of this invention to provide an improved apparatus for the control of aquatic animal life employing either portable electrical power supplies or power from existing power lines.

It is still a further object of this invention, whereby selected aquatic animal life may be diverted from its normal migratory path, while not affecting other aquatic animal life, if desired.

Further and additional objects of this invention will become apparent from a consideration of the following specification and claims, and the appended drawings.

In the broadest terms, this invention consists in guiding aquatic animals, e.g., desirable fish, migrating in a body of water, toward a specific locale such as a fish trap, a fish ladder, a diversion channel, etc. Employed as the guiding means is a D.C. field of predetermined value established in the water, disposed obliquely across the normal and expected path of travel.

It has been determined that a periodic D.C. voltage is better than a continuous voltage for leading game fish, since a beneficial short period of recovery is provided between each energizing period during which a galvanotactic response is produced. Experiments have shown that a desirable duty cycle ratio between the on and off time of the D.C. voltage, is approximately .66, although other ratios are also effective and are not to be considered as excluded. Various repetition rates may be employed but three pulses per second have been found satisfactory.

A D.C. voltage of these characteristics may be produced by any of the means known to the art, such as by a motor driven switch or commutator connected to a D.C. source, or by an electronic timing circuit. If rectified D.C. current is employed, it is not essential to have the current filtered, since the D.C. ripples do not appear to have an adverse effect on fish response.

Specifically, a transverse electrode array mounted so as to span a stream obliquely at about 45 degrees is connected to the negative terminal of a D.C. energy source. A row of electrodes is imbedded in the ground on the bank and attached to the positive terminal of the D.C. energy source. Between these electrodes is arranged a control array, which consists of another row of electrodes imbedded in the bank, in turn electrically connected to an electrode array located in the stream parallel to the negative electrode array. The control array serves two functions; it extends the electrical field at a higher intensity for a desired distance from the negative electrodes, and it eliminates or greatly reduces the electrical field near the bank and the entrance of the trap.

A mechanical trap is provided near the acute angle made by the negative electrode and the shore, which is isolated from electrical field by a metallic shield and associated guarding electrodes. This provides an electrically "cold" area within which the fish can swim freely up into the trap.

The electrical field established by the device acts as a diversionary field. Fish entering its region involuntarily turn and swim away from the negative electrodes. The 45 degree angle of the electrode array causes their predominant direction of movement to be toward the bank along which the trap is located. By suitable control of the voltage gradient of the D.C. field, desired fish species can be guided toward the trap, while many of the undesired fish will be unaffected. The latter, such as sea lampreys for example, are thereby permitted to swim into the influence of a lethal A.C. field. At suitable intervals the traps are emptied and the fish removed, either for placing back in the stream beyond the influence of the electrical fields, or otherwise disposed of, as desired.

This arrangement may also be employed with advantage to guide migratory fish away from undesired and dangerous channels, such as irrigation ditches, or penstocks.

For a more complete understanding of the invention, reference should now be made to the accompanying drawings, wherein.

Figure 1:
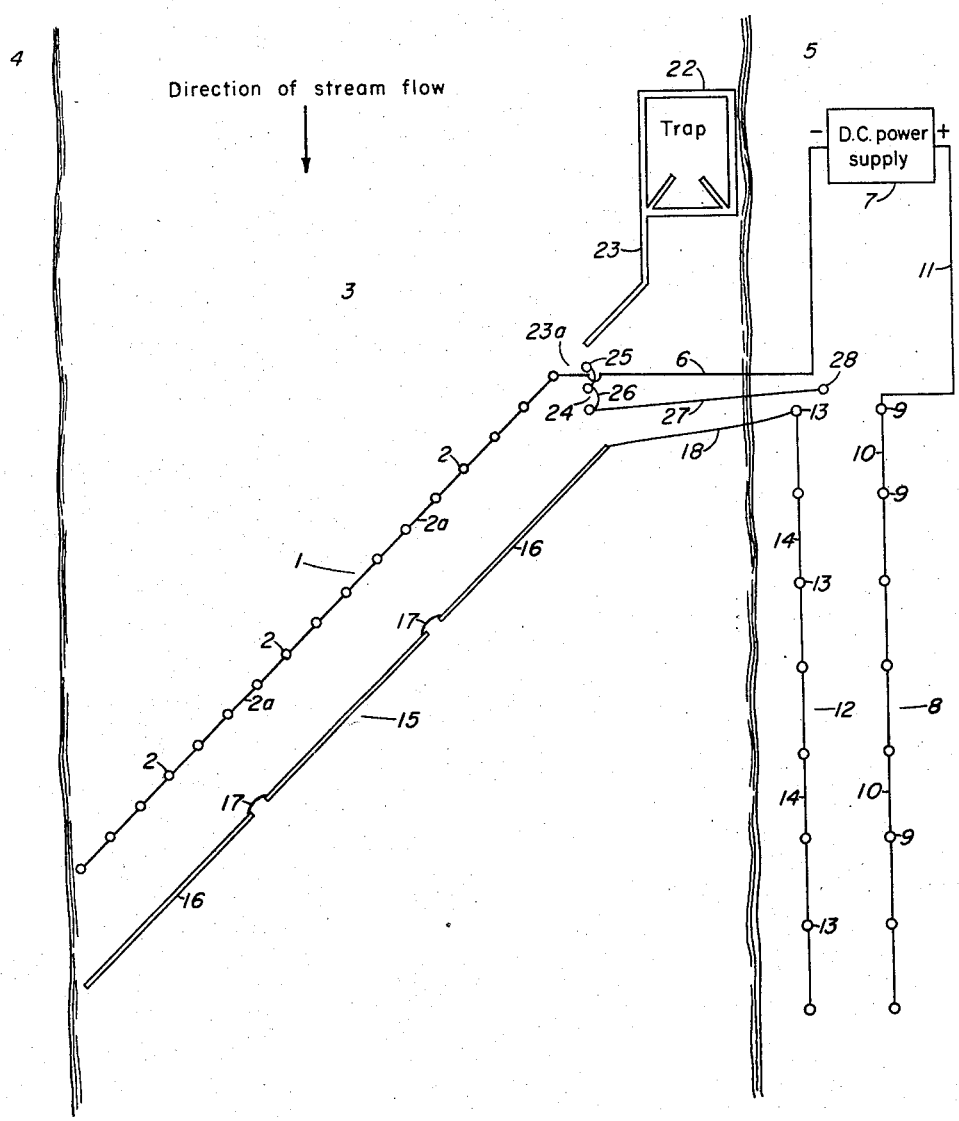
Figure 1 is a schematic plan view of an electrode installation installed in a stream.

Referring to the drawing, an electrode array 1 composed of a plurality of individual electrodes 2 extends obliquely across the greater part of a stream 3 flowing between opposing substantially parallel banks 4 and 5. The electrodes 2 are spaced a predetermined distance apart and are electrically interconnected by conductor 2a, whereby they may all be energized by being connected through conductor 6 to the negative terminal of a D.C. power supply 7 located on the bank. This D.C. power supply may be any convenient source such as rectified A.C. power obtained from a power line, or generated at the site by a mobile generator.

The negative electrode array 1 is supported in the stream by a catenary cable mounted between two posts or towers, in a conventional manner, such as described in Patent 2,778,140. See especially Figure 2 and column 6, lines 25–27 therein. Positive electrode array 8, consisting of a plurality of pipes or rods 9 of suitable diameter driven into the bank parallel to the shore and suitably spaced from the water's edge, and electrically interconnected by conductor 10, are connected to the D.C. power supply 7 by conductor 11.

Located between the positive and negative electrode arrays is a control array, which consists of bank element 12 and stream element 15. Bank element 12 consists of a plurality of electrodes 13 driven into the bank, electrically interconnected by conductors 14, and spaced laterally from and parallel to the positive electrode array 8. Stream element 15 consists of a plurality of pipes or rods 16 generally horizontal or parallel to the stream bottom and extending along a line parallel to the negative electrode array 1. Members 16 rest on the stream bottom, or else may be mounted so as to be suspended at about mid-depth. Each member 16 is electrically connected to its neighbor by conductor 17, and stream element 15 is connected to bank element 12 by electrical conductor 18.

Figure 2A:
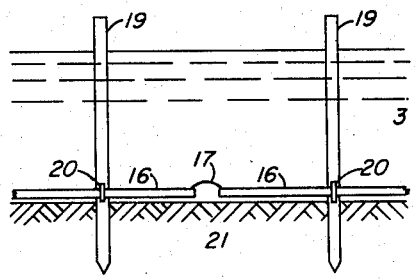
Figures 2a and 2b are elevational views of two modifications of the control array electrode.
Figure 2B:
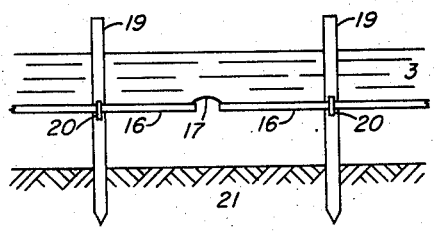

As shown in Figure 2a, post 19, which may be a steel fence post, is driven into the stream bed 21. Elements 16 rest on the stream bed and are fastened to post 19 by clamping means 20, which conveniently are U bolts. Alternatively, the stream element of the control array is mounted at mid-depth, as shown in Figure 2b. In addition, it may be found desirable under certain circumstances to have two lines of elements 16, one resting on the stream bottom, and the other supported at mid-depth.

Located at the bank, and approximately in line with the negative electrode array 1, is trap 22 (see Fig. 1) of any standard design, having wing 23, extending in the general direction of negative electrode array 1. As shown in the embodiment depicted in the drawing, trap 22 is located within the obtuse angle formed by the intersection of the axis of array 1 with the stream bank, at the upstream side. The trap and wing may be constructed of wooden or metallic framing members suitably secured to the stream bottom and covered by hardware cloth. The metallic structure in wing 23 acts as an electrical shield. Alternatively, instead of a wing 23 to act as the electrical shield, a plurality of vertical electrodes driven into the stream bed, may be employed.

The region 23a between the end of the wing and the negative electrode array has a high concentration of lines of force, in the absence of any control measures. Fish entering this region are diverted toward the wing, which is relatively electrically positive. Some fish move to the upstream side of the wing where they either manage to escape upstream to possibly encounter a lethal A.C. field, or else are narcotized and held against the wing by the electrical stimulus.

To eliminate this undesirable effect there is provided a wing control 24 consisting of a plurality of vertical electrodes 25 electrically connected by conductor 26 and driven into the stream bed and extending above the water surface. Wing control 24 is connected by conductor 27 to an electrode 28 spaced from positive electrode array 8. A field is thereby created between the end of array 1 and wing control 24, which acts to discourage any fish movement through space 23a.

Figure 3:
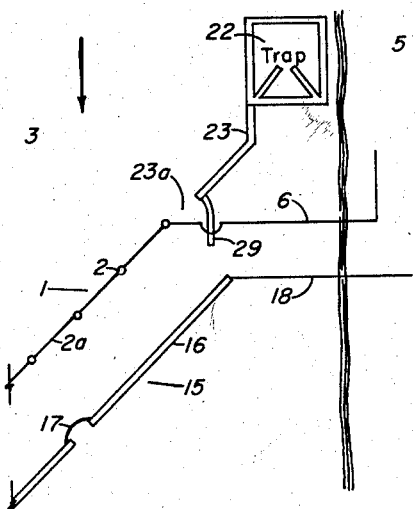
Figure 3 is a schematic plan view of the trap portion of the installation showing a modification of the trap director electrode.

Alternatively, the wing control may consist of one or more bare electrodes immersed in the stream, extending horizontally from the end of wing 23 into the region between the ends of electrodes 1 and 15. This form is illustrated in Figure 3, where element 29 is the bare electrode.

During upstream migration, the oblique D.C. field repels the fish and directs them generally to trap 22. The area between wing 23 and the bank is substantially free of any electrical field, and the fish swim freely into the trap for suitable disposition. Instead of a trap, a fish ladder counting house or fish by-pass could be provided.

The spacing between the various components of this novel fish barrier cannot be readily predetermined. The array functions as a voltage divider, so that a portion of the drop in the applied voltage occurs between the negative electrodes and the horizontal electrodes of the control array, and a portion between the units on the bank. The amount of voltage drop between each depends on the total applied voltage and the resistance of the water and soil. It is important for satisfactory operation to so space the rows of ground rods 8 and 12 as to produce a voltage drop great enough to eliminate any "collecting influence" at the horizontal electrodes 16 downstream from the vertical electrodes 2. Such "collecting influence" is due to the galvanotactic attraction of fish to a positive electrode having sufficient potential. Prolonged proximity to a positive electrode results in undesirable narcotization. The spacing between hanging electrode array 1 and the horizontal control electrode 15 must be chosen to develop a field which is adequate to control fish moving into it. Experience has shown that a distance of four to six feet gives satisfactory results.

The following are dimensions of apparatus that has been employed with satisfactory results:

a. The trap 22 is of any convenient size and is covered with ½ inch hardware cloth.

b. Wing 23 is approximately 10 feet long covered with hardware cloth extending as shown at an angle of about 45°.

c. The negative electrode array 1 consists of a suspended row of galvanized iron pipe electrode which may vary as to diameter and spacing, the larger the diameter the greater the distance between the pipes; ½ inch pipe spaced 6 inches apart and 1¼ inch pipe spaced one foot apart have been found satisfactory. The important consideration here is to provide sufficient surface area to assure an even distribution of the lines of force.

d. The positive electrode array 8 consists of a row of ground rods 6 to 8 feet long, spaced two or more feet apart and driven into the bank in a line parallel to the shore spaced at least two feet apart. The number of electrodes, the spacing between them and the depth to which they are driven into the soil is dependent upon soil conductivity.

e. The water electrode 16 of the control array consists of a number of submerged horizontal pipes 1½ inches in diameter, of convenient length, say six feet, connected to each other by flexible conducting cable, resting on the stream bed, or suspended at mid-depth.

f. The bank electrode 12 of the control array consists of a row of rods or pipes, similar to those of the positive electrode array, driven into the ground streamward and parallel to the latter. The distance between the two rows of electrodes is dependent on various factors, including the soil conductivity (or resistivity), voltage drop required and the depth to which the pipes are driven. In practice, the distance varied downwardly from four feet.

g. The wing control 24 consists of 3 pieces of 1¼ inch pipe electrodes driven into the bottom of the river and spaced about a foot apart, the first electrode 25 wing about six inches from the end of wing 23, electrically connected to each other and to a ground electrode located near the positive electrode.

The power requirement for this diversion device is relatively low. About 400 watts applied to the water to control a stream about 50 feet wide and 2 feet deep is considered desirable, though satisfactory operation was obtained with 300 to 500 watts. The voltage input may vary from 120 to 200 volts (peak voltage of unfiltered D.C.) at 4 to 6 amperes. The total power consumption including transformer and rectifier losses, etc., is about 900 watts for each device.

It is obvious therefore that this device affords a device which is relatively cheap to operate, yet is effective in accomplishing its desired purpose. Various changes and modifications may be made therein without departing from the spirit of the invention or from the appended claims.

I claim:

1. Apparatus for selectively controlling the movements of aquatic animals in a body of water having opposing banks comprising, a D.C. energy source, a grounded electrode means on one bank connected to a positive terminal of said D.C. energy source, a control electrode array extending obliquely to the bank disposed in said body of water at about mid-depth, electrical resistor means in series between said grounded electrode and the control electrode array, a negative electrode array immersed in the water and extending generally parallel to said control electrode array and spaced therefrom, said control electrode array being located between the negative electrode array and the said one bank, said negative electrode array being connected to a negative terminal of the D.C. energy source where a D.C. field of predetermined voltage gradient exists between and surrounds the control electrode array and the negative electrode array, aquatic animal refuge means adjacent said bank and the electrode arrays, and electrical shielding means extending into the body of water from said refuge means along substantially the same axis as said negative electrode array.

2. Apparatus for selectively controlling the movements of aquatic animals in a body of water having opposing banks comprising, a D.C. energy source, a grounded electrode means on one bank connected to a positive terminal of said D.C. energy source, a control electrode array extending obliquely to the bank disposed in said body of water at about mid-depth, electrical resistor means in series between said grounded electrode and the control electrode array, a negative electrode array having two ends immersed in the water and extending generally parallel to said control electrode array and spaced therefrom, said control electrode array being located between the negative electrode array and the said one bank, said negative electrode array being connected to a negative terminal of the D.C. energy source whereby a D.C. field of predetermined voltage gradient exists between and surrounds the control electrode array and the negative electrode array, aquatic animal refuge means adjacent said bank and the electrode arrays, an electrical shielding means extending into the body of water from said refuge means along substantially the same axis as said negative electrode array, said shielding means having a terminal end, the end of the shielding means being spaced from the adjacent end of the negative electrode array, director electrode means located adjacent the end of said shielding means energized to repel aquatic animals from entering the space between the shielding means and the negative array.

3. Apparatus for selectively controlling the movements of aquatic animals in a stream having substantially parallel banks comprising a D.C. energy source, a first electrode array connected to a positive terminal of the D.C. energy source, said array being imbedded in one bank parallel to the stream and spaced therefrom, a second electrode array imbedded in the bank generally parallel to said first array and spaced between the latter and the stream, a third electrode array immersed in the stream extending transversely in the stream and disposed generally parallel to the stream bed, said third electrode array being conductively connected to said second electrode array, a fourth electrode array extending transversely in the stream in a direction generally parallel to said third array and spaced therefrom, said third electrode array being located between the fourth electrode array and the said one bank, said fourth electrode array being connected to a negative terminal of the D.C. energy source, whereby a D.C. field of predetermined voltage gradient exists between and surrounds the third and fourth electrode arrays, aquatic animal refuge means adjacent said bank and the third and fourth electrode arrays, and electrical shielding means extending into the stream from said refuge means along substantially the same axis as said fourth electrode array.

4. Apparatus for selectively controlling the movement of aquatic animals in a body of water having opposing banks, a D.C. energy source, a first grounded electrode means on one of said banks, spaced from the water's edge and connected to a positive pole of the D.C. energy source, a second grounded electrode means located between the shore and the first electrode, a third electrode means disposed in the water obliquely relative to the one bank and conductively connected to said second electrode means, a fourth electrode means located in the water and spaced parallel from the third electrode means, and connected to a negative pole of the D.C. energy source, whereby a D.C. field of predetermined voltage gradient exists between and surrounds said third and fourth electrode means, the third electrode means being located between the fourth electrode means and the said one bank, refuge means adjacent the said bank, and the third and fourth electrode means, metallic barrier means extending diagonally with the body of water from said refuge means in the general direction of said fourth electrode means, the end of said barrier means being spaced axially from the end of the fourth electrode means nearest the said bank.

5. Apparatus for selectively controlling the movements of aquatic animals in a stream having substantially parallel banks, comprising a D.C. energy source, a first electrode means imbedded in one bank, and connected to a positive terminal of the D.C. energy source, a second electrode means imbedded in the said bank in spaced relationship to said first electrode means, a third electrode means located in the stream extending obliquely to said bank, said third electrode means being conductively connected to said second electrode means, a fourth electrode means in spaced relationship to the said third electrode means and disposed generally parallel thereto, said fourth electrode means being connected to the negative terminal of the D.C. energy source, whereby a D.C. field of predetermined voltage gradient exists between and surrounds the third and fourth electrode means, the third electrode means being located between the fourth electrode means and said bank, refuge means adjacent said bank and the third and fourth electrode means providing shelter for aquatic animals affected by said D.C. field, and electrical shielding means extending obliquely into the stream from said refuge means along substantially the same axis as said fourth electrode means, the end of said shielding means being spaced from the adjacent end of the fourth electrode means, and director electrode means located adjacent the end of said shielding means energized to repel aquatic animals from entering the space between the barrier and the fourth electrode means.

6. Apparatus for selectively controlling the movement of aquatic animals in a stream having substantially parallel banks, a stream bed and an upstream and downstream direction, comprising a first electrode array, comprising a plurality of vertically disposed electrically interconnected electrodes imbedded in one bank, a D.C. energy source having a positive and negative terminal, means electrically connecting said first electrode array with the positive terminal, a second electrode array, comprising a plurality of vertically disposed electrically interconnected electrodes imbedded in said bank, said second array being spaced from and parallel to the first array, and located between the stream and the first array, a third electrode array located in the stream and extending obliquely from said bank, the axes of said third array and said first array forming an acute angle, said third array comprising a plurality of electrically interconnected elongated electrodes, disposed approximately horizontally below the stream surface, said third array being connected electrically to said second array, a fourth electrode array extending obliquely from the bank comprising a plurality of laterally spaced and electrically interconnected electrodes extending vertically into said stream, said third and fourth arrays being substantially parallel, the third array being located between the fourth array and said bank, the fourth array being connected to a negative terminal of the D.C. energy source, whereby a D.C. field of predetermined voltage gradient exists between and surrounds the third and fourth electrode arrays, trap means at the bank and adjacent to the upstream end of the third and fourth electrode arrays, a metal shielding means to isolate the trap means from electrical fields, said shielding means comprising a vertical planar structure extending from the trap obliquely in a direction along the axis of said fourth array, the end of said shielding means being spaced axially from the end of the said fourth array, and director electrode means located adjacent the end of said shielding means to repel aquatic animals from entering the space between the fourth array and the shielding means.

7. An apparatus as in claim 6, wherein the director electrode means comprises a conductor fastened to the end of the shielding means, extending substantially horizontally below the water surface to a point approximately half way between the adjacent ends of the third and fourth electrode arrays.

8. An apparatus as in claim 6, wherein the director electrode means comprises a plurality of electrodes fastened to the stream bottom, and disposed adjacent the end of the shielding means spaced laterally from each other substantially along the line approximately normal to the direction of the negative electrode array, a bank electrode located adjacent first electrode array, and electrically interconnecting the bank electrode to the director electrode means.

9. Apparatus for selectively controlling the movement of aquatic animals in a stream having substantially parallel banks and a downstream flow of water, comprising a D.C. energy source, a first electrode means imbedded in one bank, and connected to a positive terminal of D.C. energy source, a second electrode means imbedded in the said bank in spaced relationship to said first electrode means, a third electrode means located in the stream extending obliquely to said bank, whereby the intersection of the axis of the third electrode means and the said bank forms an obtuse angled corner, said third electrode means being conductively connected to said second electrode means, a fourth electrode means in spaced relationship to the said third electrode means and disposed generally parallel thereto, the third electrode means being located between the fourth electrode means and said bank, said fourth electrode means being connected to the negative terminal of the D.C. energy source, whereby a D.C. field of predetermined voltage gradient exists between and surrounds the third and fourth electrode means, refuge means adjacent one bank and the third and fourth electrode means, and located within the said obtuse angled corner, providing shelter for aquatic animals affected by said D.C. field, electrical shielding means extending obliquely into the stream from said refuge means along substantially the same axis as said fourth electrode means, the end of said shielding means being spaced from the adjacent end of the fourth electrode means, and director electrode means located adjacent the end of said shielding means energized to repel aquatic animals from entering the space between the barrier and the fourth electrode means.

10. Apparatus for selectively controlling the movement of aquatic animals in a stream having substantially parallel banks, a stream bed and an upstream and downstream direction, comprising a first electrode array, comprising a plurality of vertically disposed electrically interconnected electrodes imbedded in one bank, a D.C. energy source having positive and a negative terminal, means electrically connecting said first electrode array with the positive terminal, a second electrode array, comprising a plurality of vertically disposed electrically interconnected electrodes imbedded in said bank, said second array being spaced from and parallel to the first array, and located between the stream and the first array, a third electrode array located in the stream and extending obliquely from said bank, whereby the intersection of the axis of the third electrode array and the said bank forms an obtuse angled corner, said third array comprising a plurality of electrically interconnected elongated electrodes, disposed approximately horizontally below the stream surface, said third array being connected electrically to said second array, a fourth electrode array extending obliquely from the bank comprising a plurality of laterally spaced and electrically interconnected electrodes extending vertically into said stream, said third and fourth array being substantially parallel, the third array being located between the fourth array and said bank, the fourth array being connected to a negative terminal of the D.C. energy source, whereby a D.C. field of predetermined voltage gradient exists between and surrounds the third and fourth electrode arrays, trap means at one bank and adjacent to the upstream end of the third and fourth electrode arrays, and located within the said obtuse angled corner, a metal shielding means to isolate the trap means from electrical fields, said shielding means comprising a vertical planar structure extending from the trap obliquely in a direction along the axis of said fourth array, the end of said shielding means being spaced axially from the end of the said fourth array, and director electrode means located adjacent the end of said shielding means to repel aquatic animals from entering the space between the fourth array and the shielding means.

11. An apparatus as in claim 10, wherein the director electrode means comprises a conductor fastened to the end of the shielding means, extending substantially horizontally below the water surface to a point approximately half way between the adjacent ends of the third and fourth electrode arrays.

12. An apparatus as in claim 10, wherein the director electrode means comprises a plurality of electrodes fastened to the stream bottom, and disposed adjacent the end of the shielding means spaced laterally from each other substantially along the line approximately normal to the direction of the negative electrode array, a bank electrode located adjacent first electrode array, and electrically interconnecting the bank electrode to the director electrode means.

References Cited in the file of this patent

UNITED STATES PATENTS

| | | |
|---|---|---|
| 2,233,045 | Bonner et al. | Feb. 24, 1941 |
| 2,778,140 | Applegate et al. | Jan. 22, 1957 |

FOREIGN PATENTS

| | | |
|---|---|---|
| 176,096 | Great Britain | Feb. 27, 1922 |